(12) United States Patent
Abt et al.

(10) Patent No.: US 9,950,683 B2
(45) Date of Patent: Apr. 24, 2018

(54) SENSOR HANDOVER

(71) Applicant: AUTOLIV DEVELOPMENT AB, Vargarda (SE)

(72) Inventors: Tinlian Abt, Munich (DE); Peter Loffler, Neubiberg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/526,128

(22) PCT Filed: Nov. 10, 2015

(86) PCT No.: PCT/EP2015/076162
§ 371 (c)(1),
(2) Date: May 11, 2017

(87) PCT Pub. No.: WO2016/075117
PCT Pub. Date: May 19, 2016

(65) Prior Publication Data
US 2017/0305375 A1    Oct. 26, 2017

(30) Foreign Application Priority Data
Nov. 13, 2014  (EP) .................................... 14192945

(51) Int. Cl.
*B60R 21/0134*    (2006.01)
*B60T 7/22*    (2006.01)
(Continued)

(52) U.S. Cl.
CPC ............ *B60R 21/0134* (2013.01); *B60T 7/22* (2013.01); *G01S 13/87* (2013.01); *G01S 13/931* (2013.01);
(Continued)

(58) Field of Classification Search
CPC ... B60R 21/0134; G01S 13/87; G01S 13/931; B60T 7/22; G08G 1/166
(Continued)

(56) References Cited

U.S. PATENT DOCUMENTS 6,670,910 B2 * 12/2003 Delcheccolo ...... B60K 31/0008
                                                       340/435
7,889,116 B2    2/2011 Harada et al.
(Continued)

OTHER PUBLICATIONS

International Search Report and Written Opinion of PCT/EP2015/076162, dated Feb. 2, 2016.

*Primary Examiner* — Yazan A Soofi
(74) *Attorney, Agent, or Firm* — Brinks Gilson & Lione

(57) ABSTRACT

A vehicle safety system including a detection system and a related method. The detection system is arranged to detect objects and includes at least two detectors. At least one control unit is arranged to determine that an object that is detected by an initial detector is classified as a confirmed object for the initial detector in its initial coverage area. The control unit is also arranged to determine whether at least one detection of another detector is from the same object. If so, a first preliminary detection of the other detector is classified as an intermediate low quality confirmed object for the other detector. A confirmed object is considered as a more reliable detection than a low quality confirmed object, which in turn is considered as a more reliable detection than a preliminary detection.

11 Claims, 10 Drawing Sheets

(51) Int. Cl.
*G01S 13/87* (2006.01)
*G01S 13/93* (2006.01)
*G08G 1/16* (2006.01)
*B60R 21/01* (2006.01)

(52) U.S. Cl.
CPC .... *G08G 1/166* (2013.01); *B60R 2021/01013* (2013.01); *B60T 2201/022* (2013.01); *B60T 2210/32* (2013.01); *G01S 2013/936* (2013.01)

(58) Field of Classification Search
USPC .......................................................... 701/46
See application file for complete search history.

(56) References Cited

U.S. PATENT DOCUMENTS

| | | | | |
|---|---|---|---|---|
| 2003/0201929 | A1* | 10/2003 | Lutter | G01S 7/032 342/52 |
| 2004/0083042 | A1* | 4/2004 | Strumolo | B60R 21/013 701/45 |
| 2010/0085238 | A1* | 4/2010 | Muller-Frahm | G01S 11/12 342/70 |
| 2011/0025548 | A1 | 2/2011 | Nickolaou | |
| 2014/0297171 | A1* | 10/2014 | Minemura | G08G 1/166 701/301 |

* cited by examiner

SENSOR HANDOVER

CROSS-REFERENCE TO RELATED APPLICATIONS

This application is a 35 U.S.C. § 371 National Phase Application of PCT/EP2015/076162, filed Nov. 10, 2015, which claims the benefit of priority to European Patent Application Serial No.: EP 14192945.5, filed Nov. 13, 2014, the contents of which are incorporated herein by reference in their entirety.

FIELD OF THE INVENTION

The present invention relates to a vehicle safety system in the form of a detection system and at least one control unit. The detection system is arranged to detect objects and includes at least two detectors. At least one control unit is arranged to determine that an object that is detected by an initial detector is classified as a confirmed object for the initial detector in a corresponding initial coverage area which the initial detector is arranged to cover.

BACKGROUND

Today, radar systems, camera arrangements, Lidar systems, or other sensor devices may be mounted on a vehicle in order to detect objects in order to implement functions of warnings, speed control and collision prevention. For such a sensor device it is required to obtain an azimuth angle in the form of a target bearing angle, a distance with respect to the object and a relative speed between the vehicle and the object.

It is of interest to accurately detect a target object that moves between different detectors with corresponding detecting areas via overlapping areas where a handover is performed from one detector to another. It should be determined that it is the same object that is moving from one detecting area to another as smoothly, quickly and securely as possible.

U.S. Pat. No. 7,889,116, discloses an object detecting apparatus for detecting an object by a plurality of radars. When an object continuously detected by one detecting means of interest starts to move into the detection region of another detecting means, position and velocity of an object in the overlapping area of two radars are individually determined and data processing determines if both objects are identical.

However, it is desired to obtain an improvement of the general concept disclosed in the above-referenced patent.

It is therefore an object of the present invention to provide a vehicle safety system comprising a detection system, where the detection system is able to detect a target object that moves between different detectors with corresponding detecting areas via overlapping areas and to perform quicker and more reliable handover of this object than previously described.

SUMMARY OF THE INVENTION

The above object is achieved by a vehicle safety system comprising a detection system and at least one control unit. The detection system is arranged to detect objects and comprises at least two detectors. At least one control unit is arranged to determine that an object that is detected by an initial detector is classified as a confirmed object for the initial detector in a corresponding initial coverage area which the initial detector is arranged to cover. The control unit is further arranged to determine whether at least one detection of another detector is likely to originate from the same object, and if that is the case to classify a first preliminary detection of the other detector as an intermediate low quality confirmed object for the other detector. A low quality confirmed object is considered as a more reliable detection than a preliminary detection, and a confirmed object is considered as a more reliable detection than a low quality confirmed object.

The above-mentioned object is also achieved by means of a method for a vehicle safety system as described herein.

According to an example, the other detector is arranged to cover an adjacent coverage area. The intermediate low quality confirmed object for the other detector is obtained from at least one detection in an overlapping area between the coverage areas of said detectors.

According to another example, the control unit is further arranged to determine that the other detector has detected the object for a first time at a first time in the overlapping area, and to then classify said detection as the first preliminary detection. The control unit is further arranged to determine that the initial detector and the other detector have detected an object for a consecutive second time at a second time in the overlapping area. The detection of the initial detector is classified as a confirmed object and the detection of the other detector is classified as a second preliminary detection. The control unit is further arranged to determine whether the detection of the detectors at the second time are likely to originate from the same object, and if that is the case to classify the second preliminary detection as a confirmed object for the other detector from the low quality confirmed object and the second preliminary detection. The control unit is also arranged to determine that the present detections from the detectors are from a classified confirmed object in the overlapping area, and then to classify the present detections as a confirmed fused object.

According to another example, each detector comprises a corresponding transceiver arrangement, and/or a corresponding detector control unit.

According to another example, one detector control unit is a dedicated detector master control unit that is arranged to communicate with at least one other control unit. Said other control unit is arranged to control safety means.

Other examples are disclosed in this specification and accompanying drawings.

A number of advantages are obtained by the present invention. Mainly, a device and a method are provided for obtaining a more reliable and quick handling of handover for an object from one detection system coverage area to another detection system coverage area than previously described.

BRIEF DESCRIPTION OF THE DRAWINGS

The present invention will now be described more in detail with reference to the appended drawings, where.

DETAILED DESCRIPTION

Figure 1:
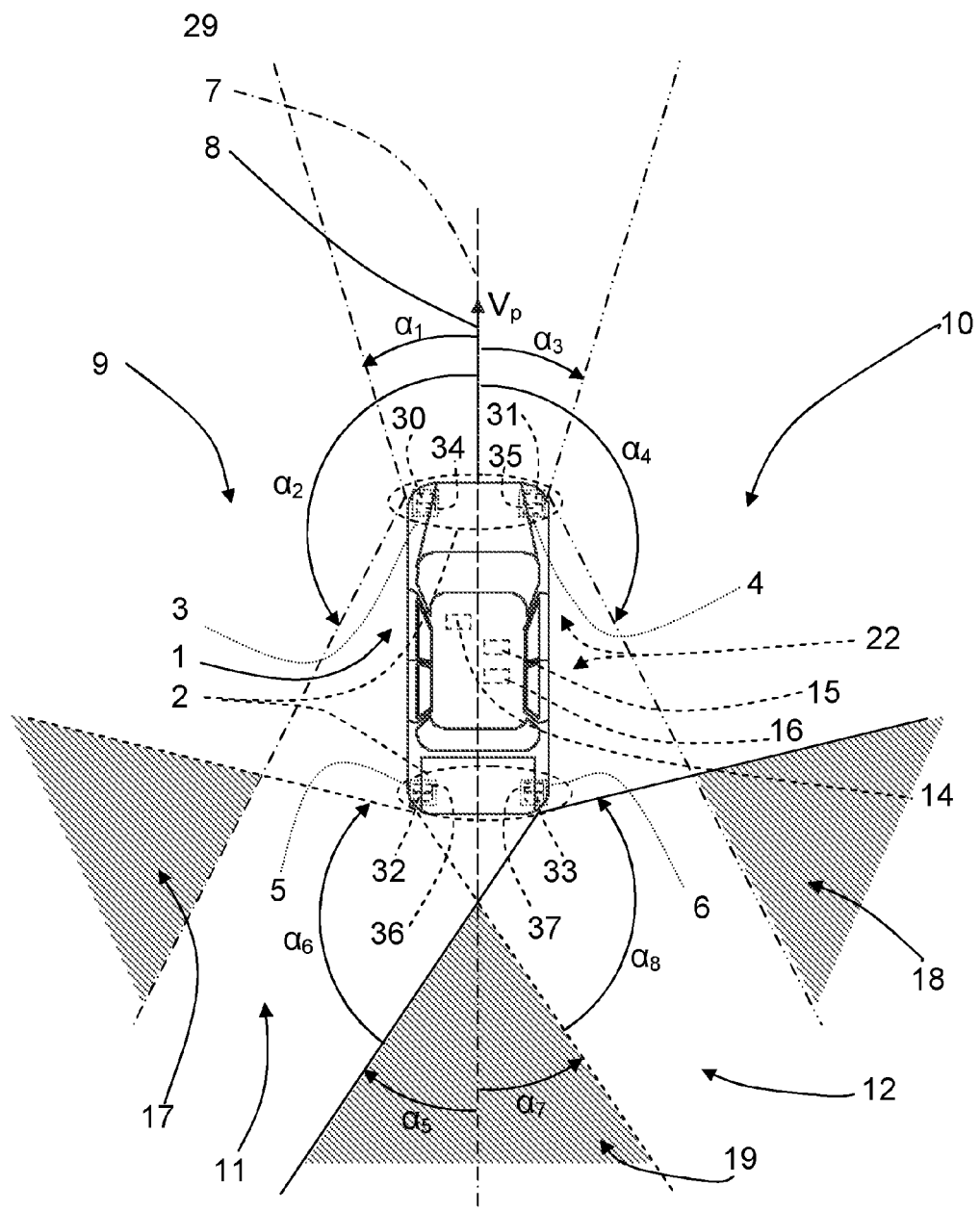
FIG. 1 shows a schematic top view of a vehicle with a radar system.

With reference to FIG. 1, a present vehicle 1 includes a radar system 2, which in turn having a front left radar detector 3, a front right radar detector 4, a rear left radar detector 5 and a rear right radar detector 6. Each radar detector 3, 4, 5, 6 includes a corresponding front left transceiver arrangement 30, front right transceiver arrangement 31, rear left transceiver arrangement 32, rear right transceiver arrangement 33, as well as a corresponding front left detector control unit 34, front right detector control unit 35, rear left detector control unit 36 and rear right detector control unit 37.

Each transceiver arrangement 30, 31, 32, 33 is arranged to send and receive radar signals at different azimuth angles in an azimuth plane with reference to a longitudinally extending symmetry line 7 that divides the present vehicle 1 in two symmetric halves; this is of course only an example, and any reference line is suitable. A normal forward running direction 8 extends along the symmetry line, where the present vehicle 1 is moving with a certain first present velocity $v_p$.

The front left radar detector 3 is arranged to cover a first coverage area 9, the front right radar detector 4 is arranged to cover a second coverage area 10, the rear left radar detector 5 is arranged to cover a third coverage area 11, and the rear right radar detector 6 is arranged to cover a fourth coverage area 12.

The first coverage area 9 is indicated with dash-dotted lines and is limited by a first azimuth angle $\alpha_1$ and a second azimuth angle $\alpha_2$; the second coverage area 10 is indicated with dash-double-dotted lines and is limited by a third azimuth angle $\alpha_3$ and a fourth azimuth angle $\alpha_4$; the third coverage area 11 is indicated with dashed lines and is limited by a fifth azimuth angle $\alpha_5$ and a sixth azimuth angle $\alpha_6$; and the fourth coverage area 12 is indicated with solid lines and is limited by a seventh azimuth angle $\alpha_7$ and an eighth azimuth angle $\alpha_8$.

The first coverage area 9 and the third coverage area 11 have a first overlapping area 17; the second coverage area 10 and the fourth coverage area 12 have a second overlapping area 18; and the third coverage area 11 and the fourth coverage area 12 have a third overlapping area 19. The overlapping areas 17, 18, 19 are partially indicated with diagonal line patterns.

It is of interest to perform a quick and reliable hand-over for an incoming object such as a vehicle when it leaves one coverage area and enters another coverage area via an overlapping area.

The present vehicle 1 includes a safety control unit 14 and safety system 15, 16, in this example an emergency braking system 15 and an alarm signal device 16, where the safety control unit 14 is arranged to control the safety system 15, 16 in dependence of input from different sensors. The safety control unit 14, the safety means 15, 16 and the azimuth angles are only indicated in FIG. 1 for reasons of clarity of the drawings, but should be regarded as present in FIG. 2, FIG. 3 and FIG. 4 as well.

At least one of the detector control units 34, 35, 36, 37 is arranged to output detector data to the safety control unit 14, see discussion about having a detector master control unit below. The safety control unit 14 is in turn arranged to perform necessary calculations for evaluating the present situation and to determine whether an emergency situation exists and whether any step needs to be taken such as for example an issuing an alarm signal by means of the alarm signal device 16 and/or emergency braking for example, by activating the emergency braking system 15.

The detector data is in the form of detected data that has been processed by each of the detector control units 34, 35, 36, 37, where the detected data is communicated between the detector control units 34, 35, 36, 37. One of the detector control units 34, 35, 36, 37 is a dedicated detector master control unit, in this example, the front right detector control unit 35 is the dedicated detector master control unit, but this is of course only an example. The dedicated detector master control unit is preferably connected directly to each one of the other detector control units, and may have more computational power than the other detector control units. The detector master control unit is arranged to compile detector data from all detector control units and forward final computed detector data to the safety control unit 14.

A detected object is first classified as a preliminary detection, since it still is not determined that the detected object is a vehicle, but may be a ghost object that for example is due to multipath reflections. The radar detection process runs in radar detection cycles of a predetermined time, and is controlled by the respective detector control units 34, 35, 36, 37.

After three consecutive cycles, i.e. at the fourth detection, there have been three preliminary detections, and the fourth detection may be determined to be classified as a confirmed object if the three previous preliminary detections are determined to fulfill certain criteria. Having three consecutive cycles before determining that a detection indeed constitutes, and is classified as, a confirmed object is described for example for avoiding noise as detection, and for detecting lateral velocity. This means that a detection is classified either as a preliminary detection or as a confirmed object. In the following, a first example will be described.

Figure 2:
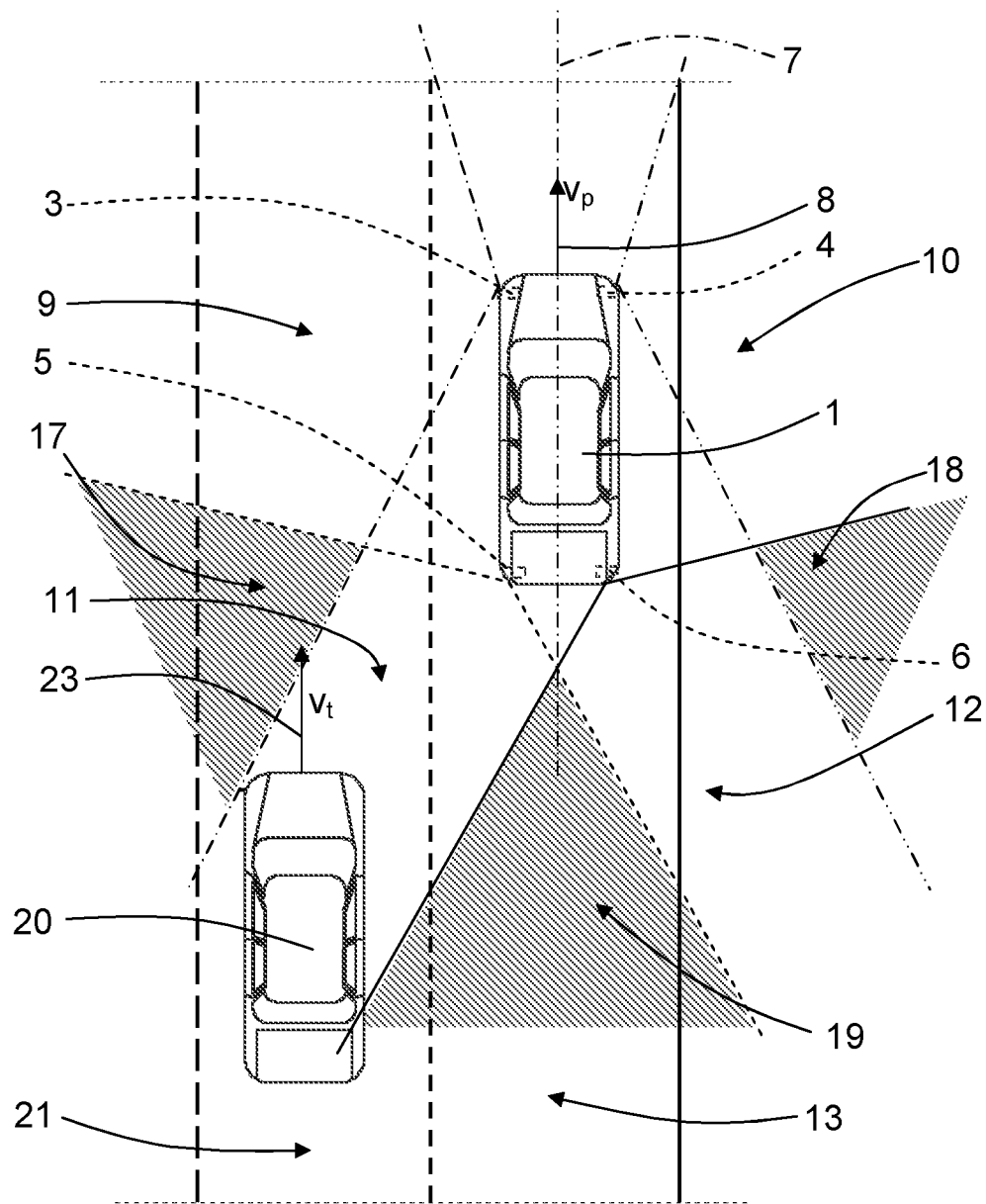
FIG. 2 shows a schematic top view of a vehicle with a radar system and a detected vehicle traveling in a third coverage area in an adjacent lane on a road according to a first example.

With reference also to FIG. 2, the present vehicle 1 is traveling in a first lane 13, and a detected vehicle 20 is traveling in a second, adjacent, lane 21 in a forward running direction 23 with a first target velocity $v_t$ that exceeds the first present velocity $v_p$.

Figure 3:
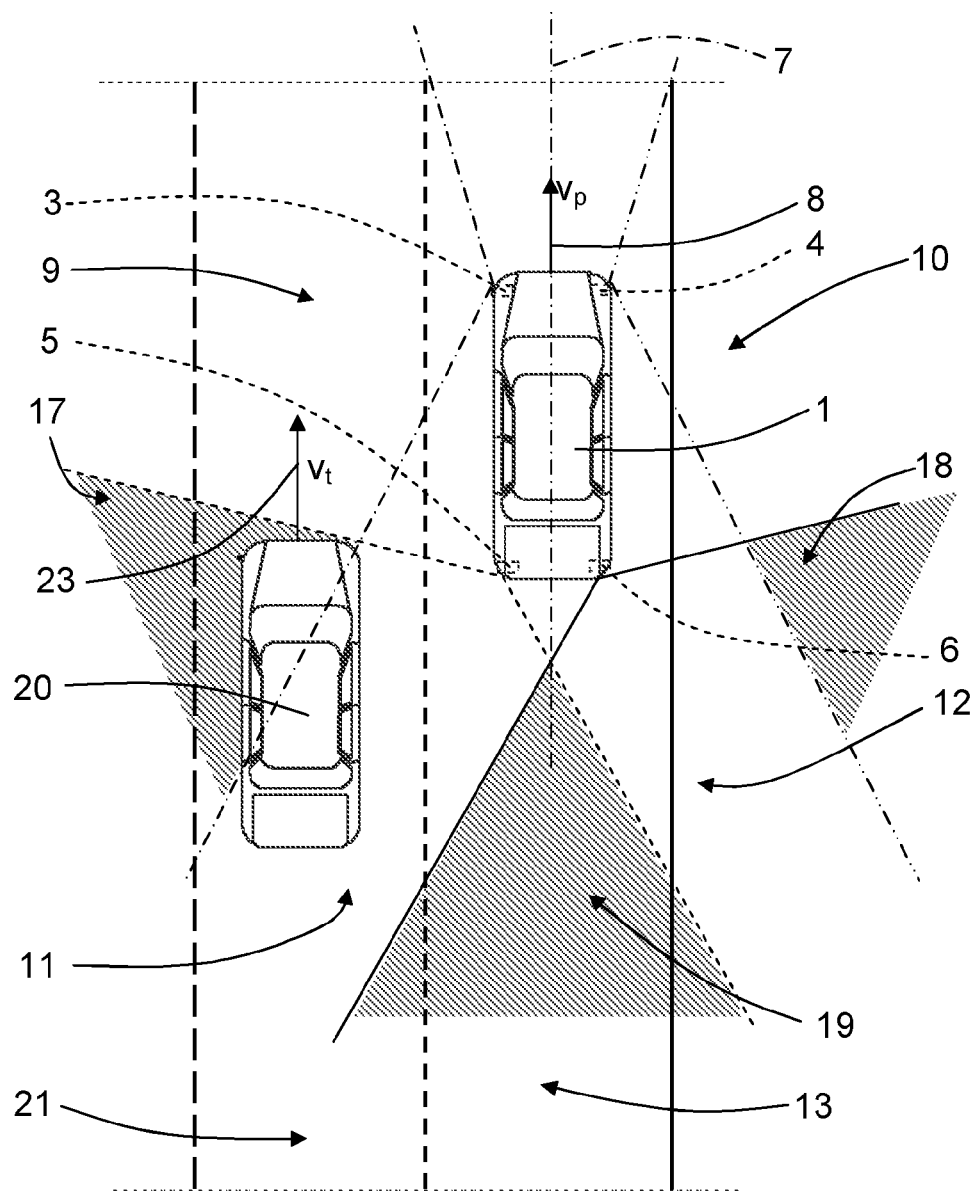
FIG. 3 corresponds to FIG. 2, but where the detected vehicle has entered an overlapping area.

Here, the detected vehicle 20 is mainly detected by the rear left radar detector 5, being in the third coverage area 11, and is moving towards the first coverage area 9 via the first overlapping area 17. In FIG. 3, the detected vehicle 20 has entered the first overlapping area 17, and in FIG. 4, the detected vehicle 20 has entered the first coverage area 9.

During this course of action, the rear left radar detector 5 has to perform a hand-over to the front left radar detector 3, a procedure that is controlled by the rear left detector control unit 36 and the front left detector control unit 34. In the following this procedure is described.

At an initial time $t_0$, the third radar detector 5 has performed at least four detections of consecutive cycles of the oncoming detected vehicle 20 as shown in FIG. 2, such that the detected vehicle 20 has been classified as a confirmed object. The total result of the detection at this point is thus classified as a confirmed object, detected by the rear left radar detector 5.

At a first time $t_1$, when the detected vehicle 20 has entered the first overlapping area 17 as shown in FIG. 3, a detection is made by the front left radar detector 3 of the oncoming detected vehicle 20 that is classified as a first preliminary detection, and the rear left radar detector 5 performs another detection that still is classified as a confirmed object. The total result of the detections at this point is classified as a confirmed object, detected by the rear left radar detector 5.

According to the present invention, as the detector control units 34, 35, 36, 37 communicate with each other, at this time the front left detector control unit 34 has become aware of the confirmed object detected by the rear left detector control unit 37, and produces an intermediate result that is a combination of the confirmed object detected by the rear left radar detector 5 and the first detection by the front left radar detector 3, where this intermediate result is a re-classification of the first preliminary detection to a confirmed object of low quality, a low quality confirmed object, detected by the front left radar detector 3.

Figure 4:
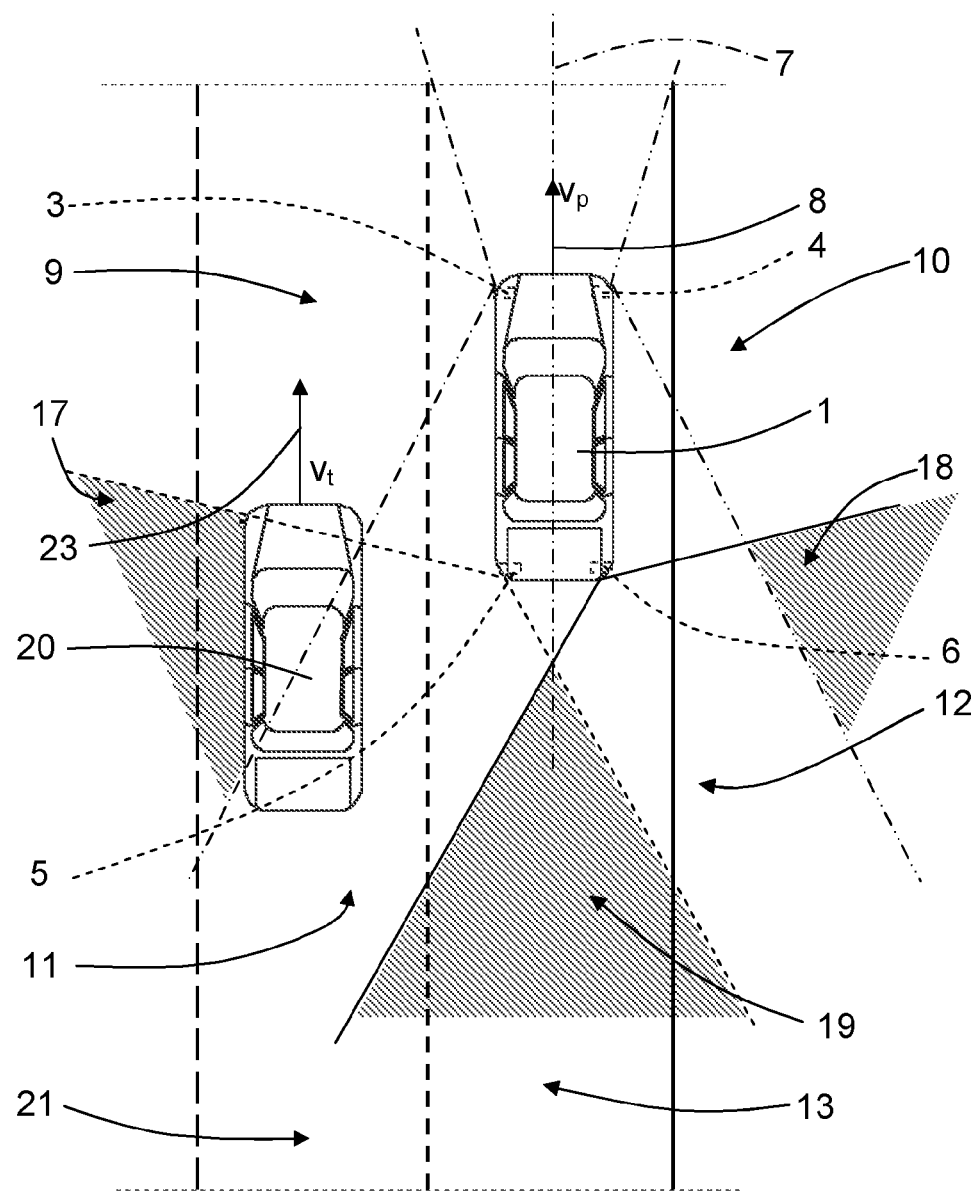
FIG. 4 corresponds to FIG. 3, but where the detected vehicle has entered a first coverage area.

One cycle later, at a second time $t_2$, the detected vehicle is still in the first overlapping area 17 as shown in FIG. 4. Now, a detection is made by the front left radar detector 3 of the oncoming detected vehicle 20 that is classified as a second preliminary detection, and the rear left radar detector 5 performs another detection that still is classified as a confirmed object.

The front left detector control unit 34 is now arranged to first combine the low quality confirmed object of the front left radar detector 3 with the second preliminary detection of the front left radar detector 3 and to re-classify the second preliminary detection to a confirmed object, detected by the front left radar detector 3. Since the detector control units 34, 35, 36, 37 communicate with each other, the detector master control unit 35 has acquired all necessary data from the front left control unit 34 to perform a fusion as will be described below.

The detector master control unit 35 is now arranged to combine the confirmed object of the rear left radar detector 5 with the confirmed object of the front left radar detector 3 and classify the corresponding detections as a confirmed fused object, which constitutes a total result. In other words, now the detector master control unit 35 is arranged to confirm that both the rear left radar detector 5 and the front left radar detector 3 have detected an object that is one and the same and that is classified as a confirmed object, and which object presently is present in the first overlapping area 17. A confirmed fused object is thus a product of a confirmed object detected by two different radar detectors.

Figure 5:
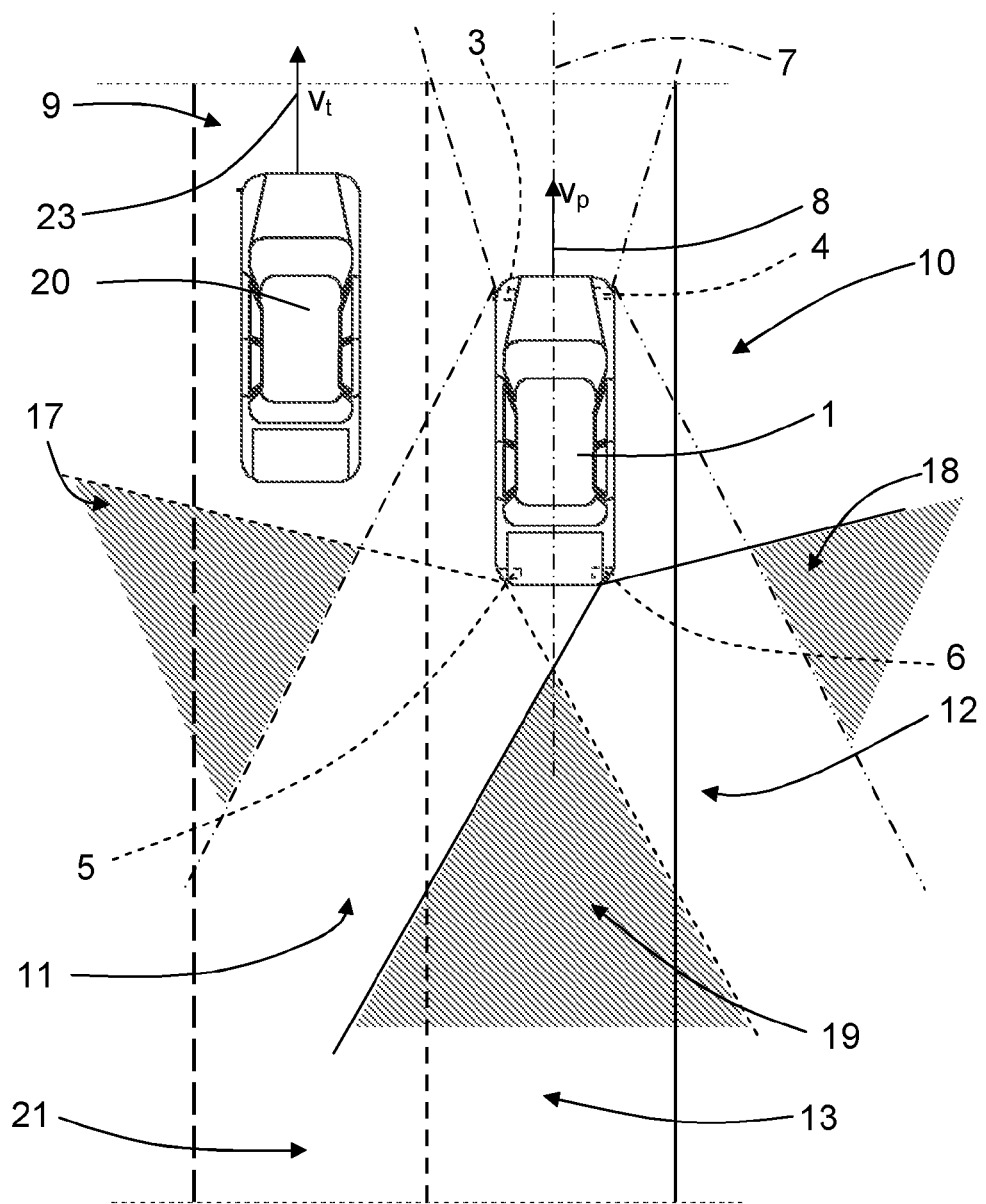
FIG. 5 corresponds to FIG. 4, but at a consecutive radar detection cycle.

At a third time $t_3$, the detected vehicle has left the first overlapping area 17 and entered the first coverage area 9 as shown in FIG. 5. Now, the rear left radar detector 5 can no longer detect the detected vehicle 20, which at this moment only is detected by the front left radar detector 3. The detection is here still determined to be classified as a confirmed object that is detected by the front left radar detector 3, and this forms the total result. This state continues until another radar detector also detects the detected vehicle 20, or until the detected vehicle 20 moves out of range of any radar detector.

This means that except being classified as a preliminary detection or as a confirmed object, a detection may also be classified as a low quality confirmed object, and two confirmed objects from two different radar sensors that are determined to relate to the same object may be classified as a confirmed fused object.

The total result at each time is the determined output result of the radar detectors 3, 4, 5, 6 regarding a certain object, and the current total result is output from the detector master control unit 35 to the safety control unit 14, and each one of the total results obtained is used for determining whether any emergency situation exists, and at a further step, the safety control unit 14 is arranged to determine whether any safety system 15, 16 need to be activated.

By means of the present invention, the detector master control unit 35 is arranged to determine that the detected vehicle 20 is a confirmed object of the front left radar detector 3 earlier than after the three cycles have passed after the first detection of the detected vehicle 20 by the front left radar detector 3 and to then perform the fusion. This is possible since the front left detector control unit 34 is arranged to form an intermediate result that is used at the following cycle to form a confirmed object by using the intermediate result and a second preliminary detection, and to communicate this to the other detector control units 35, 36, 37, and amongst them the detector master control unit 35.

It should be understood, that in order to be able to form such an intermediate result, it is necessary that the first preliminary detection of the front left radar detector 3 and the confirmed object of the rear left radar detector 5 at the first time $t_1$ fulfill certain criteria that enables the control unit 14 to draw the conclusion that the preliminary detection of the front left radar detector 3 and the confirmed object of the rear left radar detector 5 possibly relate to one and the same object. How such criteria and possible thresholds are chosen is considered as obvious design options for the skilled person and may for example include matching of position and velocity, but are not further discussed here. The association process, i.e. whether detections and objects belong to the same physical object, is running on one or more of the four detector control units 34, 35, 36, 37.

Figure 10:
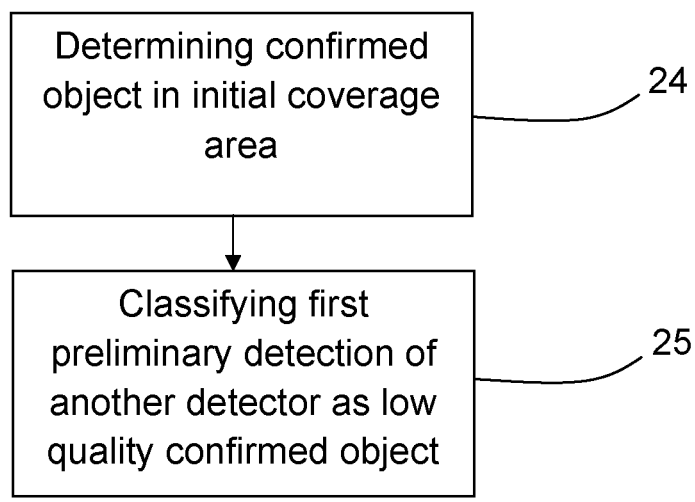
FIG. 10 shows a flowchart for a method according to the present invention.

With reference to FIG. 10, the present invention also relates to a method for a vehicle safety system comprising the steps: 24—determining that an object 20 that is detected by an initial detector is classified as a confirmed object for the initial detector 5 in a corresponding initial coverage area which the initial detector 5 is used to cover; and 25—determining whether at least one detection of another detector 3, 39 is likely to originate from the same object, and if that is the case, classifying a first preliminary detection of the other detector 3, 39 as an intermediate low quality confirmed object for the other detector 3, 39.

A low quality confirmed object is considered as a more reliable detection than a preliminary detection, and a confirmed object is considered as a more reliable detection than a low quality confirmed object.

The present invention is not limited to the examples above, but may vary freely within the scope of the appended claims. For example, other detection systems than radar systems are conceivable, such as for example Lidar systems or camera arrangements. Generally, the radar system 2 is constituted by a detection system 2, and the detector may comprise any suitable number of detectors, but at least two such that the detection system 2 is arranged to cover at least two coverage areas, and suitably with an intermediate overlapping area. However, there may be blind areas as disclosed in a second example below.

Figure 6:
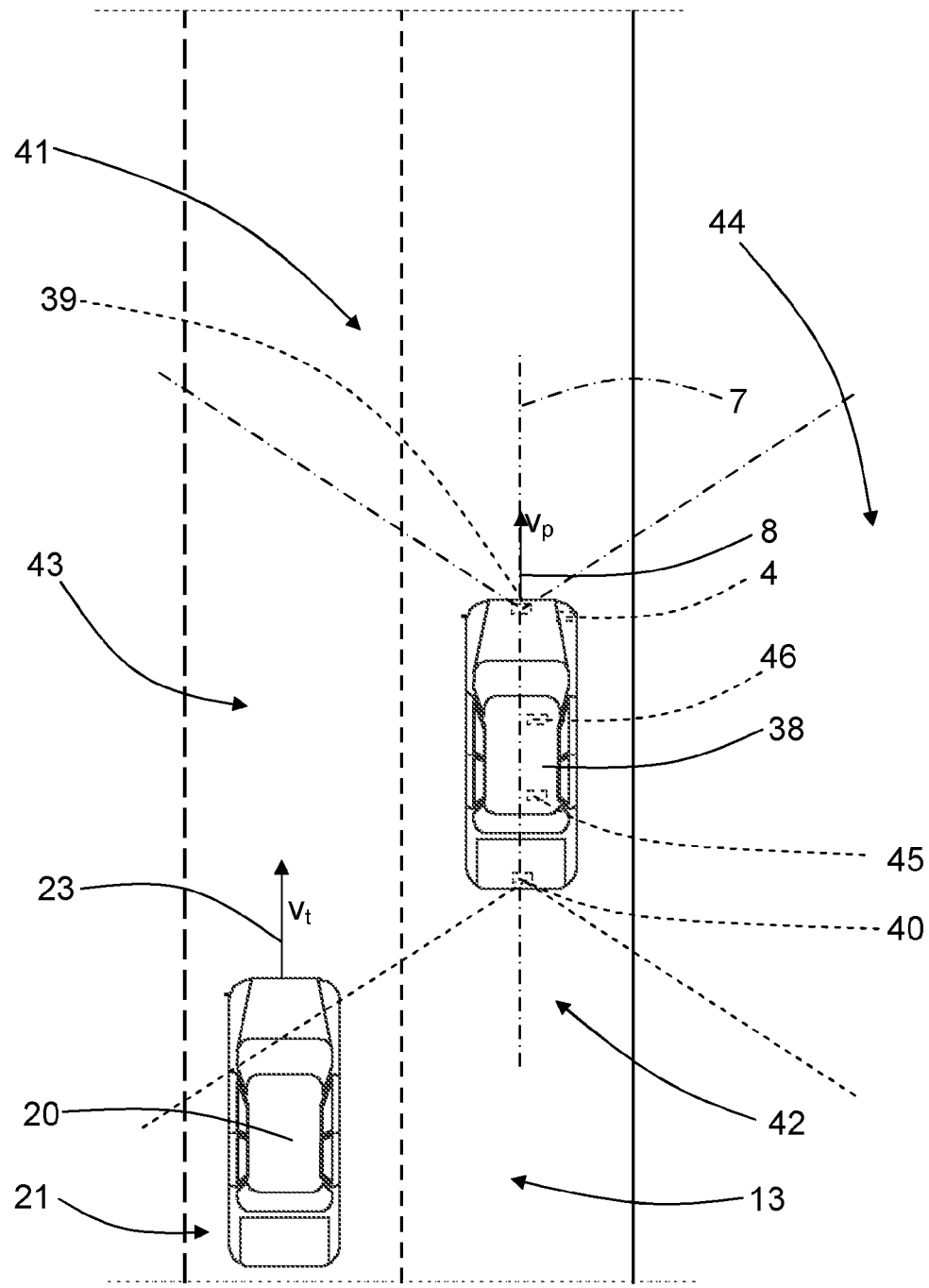
FIG. 6 shows a schematic top view of a vehicle with a radar system and a detected vehicle traveling in a rear coverage area in an adjacent lane on a road according to a second example.

With reference to FIG. 6, showing a second example, there is a present vehicle 38 that only includes two radar detectors 39, 40; a front radar detector 39 and a rear radar detector 40, where these radar detectors in the form of corresponding transceivers and control units as for the first example, although these are not shown in the Figures related to this example for reasons of clarity. The present vehicle 38 includes a safety control unit 45 and one or more safety devices 46.

The front radar detector 39 is arranged to cover a front coverage area 41, and the rear radar detector 40 is arranged to cover a rear coverage area 42. The front coverage area 41 and the rear coverage area 42 do not overlap, such that a first blind area 43 and a second blind area 44 are formed. As before, the radar detectors 39, 40 are arranged to communicate with each other, and both radar detectors, or one that comprises a dedicated master control unit, are/is arranged to communicate with the safety control unit 45.

At an initial time, the rear radar detector 40 has performed at least four detections of consecutive cycles of an oncoming detected vehicle 20 in the rear coverage area 42, such that the detected vehicle 20 has been classified as a confirmed object. The detected vehicle 20 is of the same kind as in the first example. The total result of the detection at this point is thus classified as a confirmed object, detected by the rear radar detector 40, where the total result is communicated to the safety control unit 45.

Figure 7:
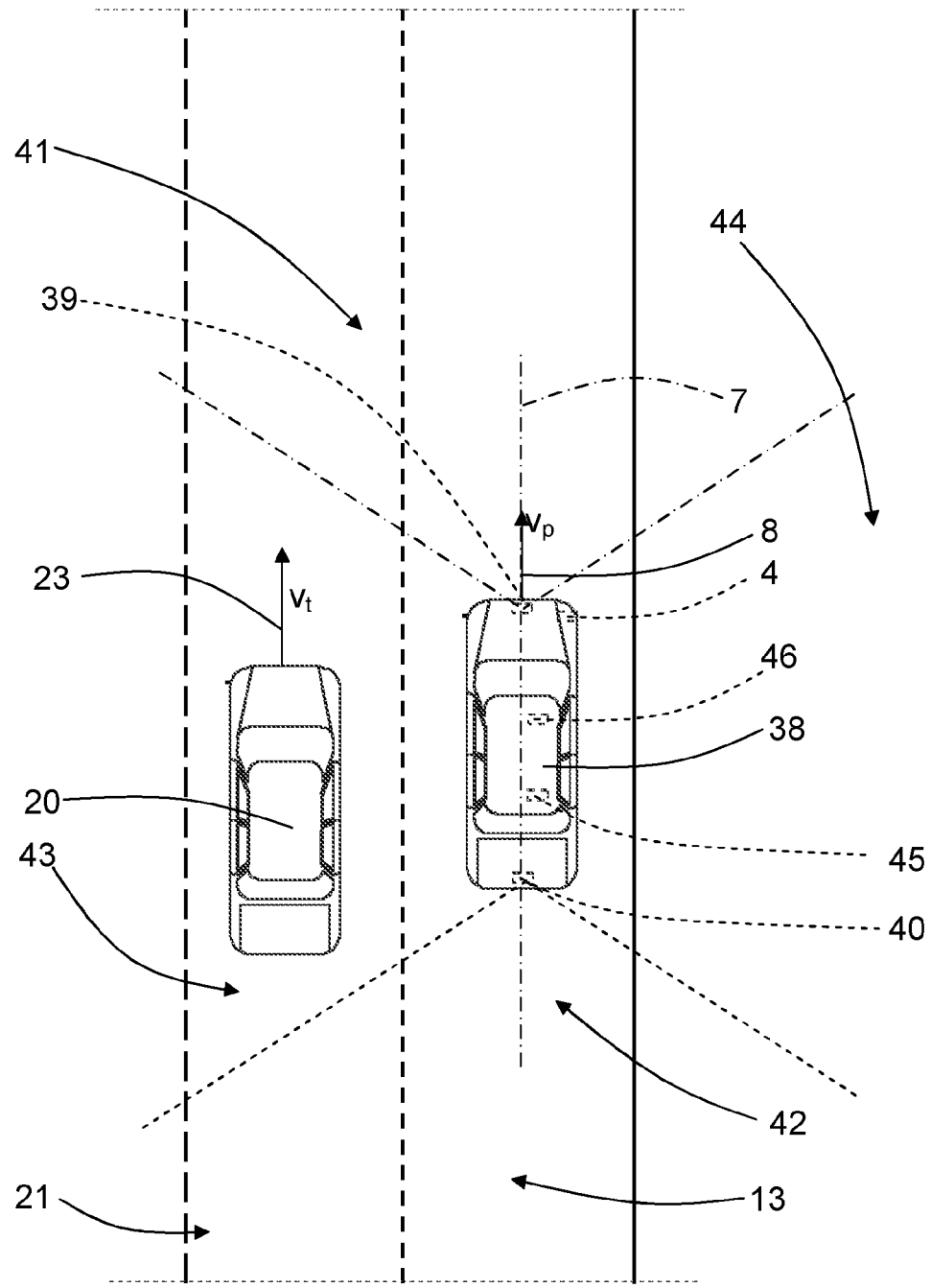
FIG. 7 corresponds to FIG. 6, but where the detected vehicle has entered a blind area.

When the detected vehicle 20 has entered the first blind area 43 as shown in FIG. 7, there are no detections made. Instead, the rear radar detector 40 is arranged to create a predicted confirmed object for the first blind area 43, which constitutes a total result that is communicated to the safety control unit 45. This prediction is based on extrapolation of available information.

Figure 8:
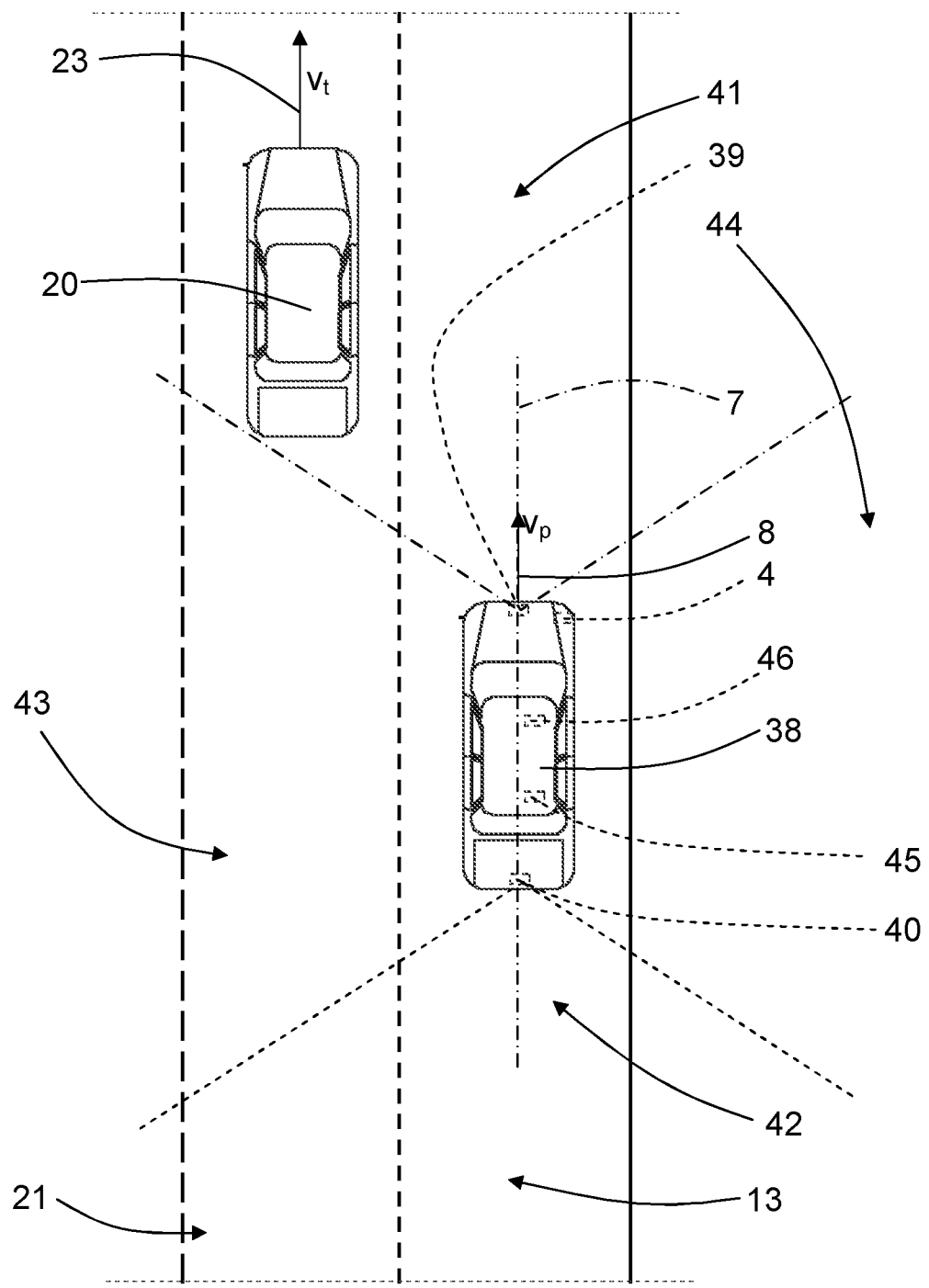
FIG. 8 corresponds to FIG. 7, but where the detected vehicle has entered a front coverage area.

When the detected vehicle 20 has entered the front coverage area 41 as shown in FIG. 8, a front detection is made by the front radar detector 39 of the oncoming detected vehicle 20, where this detection is classified as a first preliminary front detection.

The front radar detector 39 is then arranged to produce an intermediate result that is a combination of the predicted confirmed object determined by the rear radar detector 40 and the first preliminary front detection by the front radar detector 39, where this intermediate result is a re-classification of the first preliminary front detection as a low quality confirmed object, detected by the front radar detector 39, which constitutes a total result that is communicated to the safety control unit 45.

Figure 9:
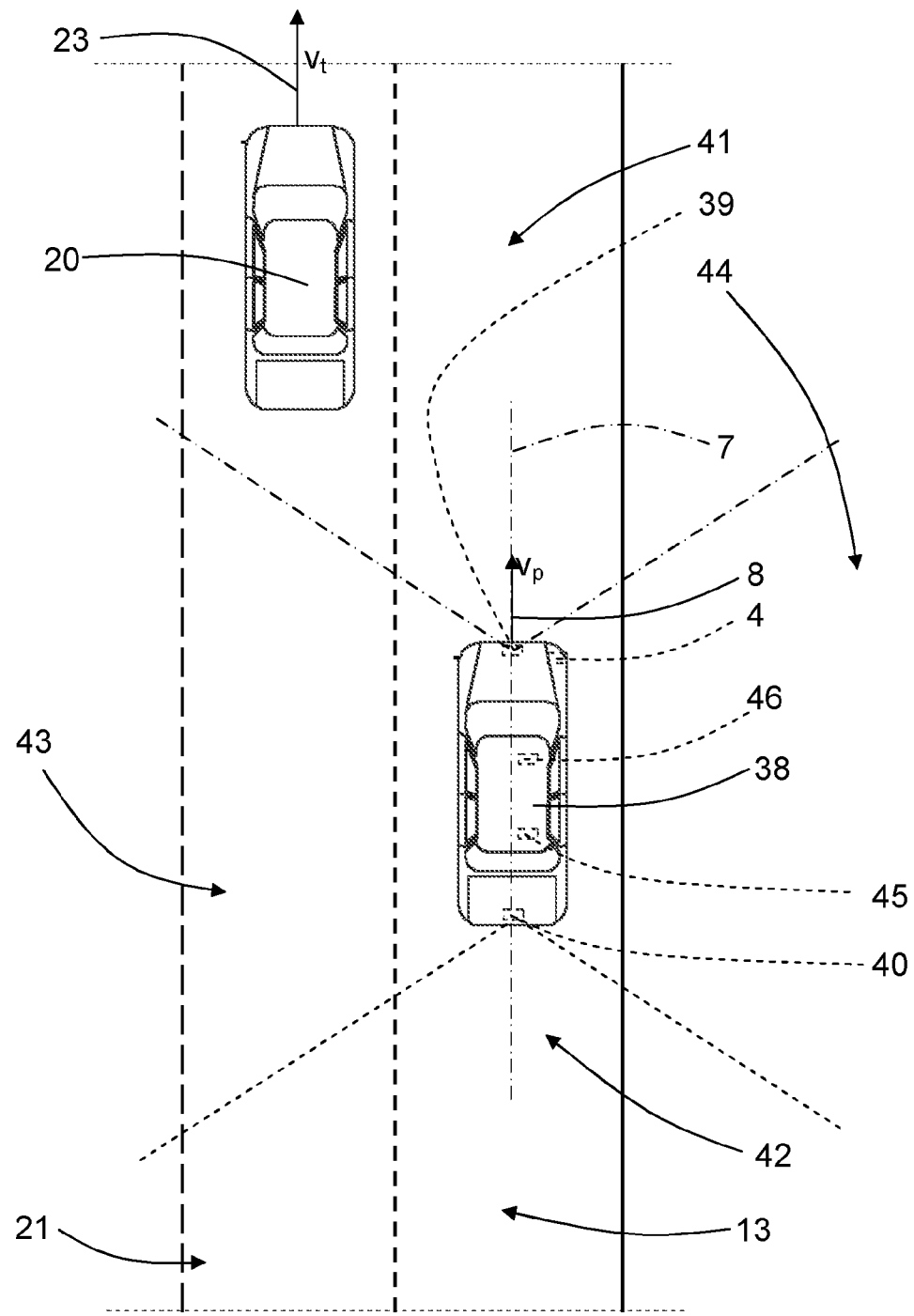
FIG. 9 corresponds to FIG. 8, but at a consecutive radar detection cycle.

One radar detection cycle later, as shown in FIG. 9, another front detection is made by the front radar detector 39 of the oncoming detected vehicle 20 that is classified as a second preliminary front detection. The front detector 39 is now arranged to combine the low quality confirmed object of the front radar detector 39 with the second preliminary detection of the front radar detector 39 and to re-classify the second preliminary detection to a confirmed object, detected by the front radar detector 39. The confirmed object constitutes a total result that is communicated to the safety control unit 45.

In the second example, there may be a master detector control unit as in the first example.

In all examples, a low quality confirmed object is considered as a more reliable detection than a preliminary detection, and where a confirmed object is considered as a more reliable detection than a low quality confirmed object.

In the examples disclosed above, the detected vehicle 20 has been shown as positioned behind and laterally displaced relative the present vehicle 1. However, generally, the detected vehicle 20 may be displaced relative the present vehicle 1 in any suitable way, and the present invention is applicable for any time the detected vehicle moves from one coverage area to another coverage area via the intermediate overlapping area. For example, the detected vehicle 20 can change lanes behind the detected vehicle 1, moving from the third coverage area 11 to the fourth coverage area 12 via the third overlapping area 19.

In the case of the detection system 2 being a radar system 2, all microwave parts of the radar system 2 are assumed to be of a previously known design, and the radar system 2 includes more parts than shown, for example transmitting and receiving antennas. The radar system 2 may furthermore comprise a number of other parts.

With reference to FIG. 1, the detection system 2, the safety control unit 14 and the safety system 15, 16 are in the form of a vehicle safety system 22.

All details given in the example are of course only given as an illustration of the present invention, and should not be regarded as limiting in any way.

In the examples, the radar transceiver 3 is arranged to send and receive radar signals 5 at different azimuth angles in an azimuth plane, and in the text only coverage areas are discussed. Of course the coverage is in fact in the form of a volume, but for practical reasons, in this context, only coverage areas are discussed, where a coverage area is formed by a suitable elevation cut of radar signal beams.

Generally, the present invention can be applied to detected vehicles at orientations different than detected vehicles mainly traveling in the same direction as a present vehicle such as for example crossing or oncoming detected vehicles.

All control units 14; 34, 35, 36, 37 may each be constituted by two or more separate control units. Instead of having detector control units that communicate with one detector control unit that functions as a master detector control unit, the detector control units may communicate with a separate master control unit. It is also possible that there are no separate detector control units, where the radar detectors then are arranged to communicate directly with one master control unit that even could be the same as the safety control unit 14. Having separate detector control units that communicate with one master detector control unit is beneficial since computational load is distributed and less data bus communication is needed. However, when there are no separate detector control units, and the radar detectors are arranged to communicate directly with one master control unit, less hardware is needed.

How much computation that is performed by the master detector control unit when a master detector control unit is used may of course vary. In the examples described, the master detector control unit 35 is arranged to perform the fusion of two confirmed objects and to communicate with the safety control unit 14. More or less computational load may be dedicated to the master detector control unit 35, which for example may be arranged to perform all intermediate re-classifications of detections from all radar detectors 3, 4, 5, 6.

Generally, the present invention relates to a vehicle safety system 22 comprising a detection system 2, at least one control unit 14; 34, 35, 36, 37 and safety system 15, 16. In view of the above, this means that at least one control unit may be comprised in the detection system 2.

The detection system 2 is arranged to detect a detected vehicle 20 or any other suitable object positioned displaced relative to the detection system 2. The vehicle safety system is arranged to be comprised in a present vehicle 1.

An object in this context does not have to be a vehicle or other mobile object, but may also be a fixed structure such as a road-fence or traffic sign.

While the above description constitutes the preferred embodiment of the present invention, it will be appreciated that the invention is susceptible to modification, variation and change without department from the proper scope and fair meaning of the accompanying claims.

The invention claimed is:

1. A vehicle safety system comprising a detection system and at least one control unit, where the detection system is arranged to detect objects (20), where the detection system includes at least two detectors, where the at least one control unit is configured to:
   determine that an object that is detected by an initial of the two detectors is classified as a confirmed object for the initial detector in a corresponding initial coverage area which the initial detector is arranged to cover; and
   an other detector is arranged to cover an adjacent coverage area, where an intermediate low quality confirmed object for the other detector is obtained from at least one detection in an overlapping area between the coverage areas of the two detectors
   the control unit further is configured to:
   determine whether at least one detection of the other detector of the two detectors is likely to originate from the same object, and if that is the case to classify a first preliminary detection of the other detector as the intermediate low quality confirmed object for the other detector, where a low quality confirmed object is considered as a more reliable detection than a preliminary detection of the other detection, and where a confirmed object is considered as a more reliable detection than the low quality confirmed object,
   determine that the other detector has detected the object for a first time at a first time ($t_1$) in the overlapping area, and to then classify the detection as the first preliminary detection,
   determine that the initial detector and the other detector have detected an object for a consecutive second time at a second time ($t_2$) in the overlapping area, where the detection of the initial detector is classified as a confirmed object and the detection of the other detector is classified as a second preliminary detection,
   determine whether the detection of the two detectors at the second time ($t_2$) are likely to originate from the same object, and if that is the case to classify the second preliminary detection as a confirmed object for the other detector from the low quality confirmed object and the second preliminary detection, and
   determine that the present detections from the two detectors are from a classified confirmed object in the overlapping area, and then to classify the present detections as a confirmed fused object.

2. The vehicle safety system according to claim 1, wherein each detector comprises a corresponding transceiver arrangement.

3. The vehicle safety system according to claim 1, wherein each of the two detectors comprises a corresponding detector control unit.

4. The vehicle safety system according to claim 3, further comprising in that at least one detector control unit is arranged to communicate with at least one other control unit, where said other control unit is arranged to a control safety system.

5. The vehicle safety system according to claim 4, further comprising that one detector control unit is a dedicated detector master control unit that is arranged to communicate with at least one other control unit, where said other control unit is arranged to control the safety system.

6. The vehicle safety system according to claim 5, further comprising the safety system is in the form of an emergency braking system or an alarm signal device.

7. The vehicle safety system according to claim 1, further comprising in that the at least two detectors are radar detectors, each of the radar detector comprising a corresponding transceiver arrangement that is arranged to send and receive radar signals.

8. A method for a vehicle safety system, where the method comprises the step of:
   determining that an object that is detected by an initial detector is classified as a confirmed object for the initial detector in a corresponding initial coverage area which the initial detector is used to cover, wherein another detector is used for covering an adjacent coverage area, where an intermediate low quality confirmed object for the other detector is obtained from at least one detection in an overlapping area between the coverage areas of said detectors;
   determining whether at least one detection of another detector is likely to originate from the same object, and if that is the case, classifying a first preliminary detection of the other detector as an intermediate low quality confirmed object for the other detector, where a low quality confirmed object is considered as a more reliable detection than a preliminary detection, and where a confirmed object is considered as a more reliable detection than a low quality confirmed object;
   determining that the other detector has detected the object for a first time at a first time ($t_1$) in the overlapping area, and then classifying the detection as the first preliminary detection;
   determining that the initial detector and the other detector have detected an object for a consecutive second time at a second time ($t_2$) in the overlapping area, where the detection of the initial detector is classified as a confirmed object and the detection of the other detector is classified as a second preliminary detection;
   determining whether the detection of the detectors at the second time ($t_2$) are likely to originate from the same object, and if that is the case classifying the second preliminary detection as a confirmed object for the other detector from the low quality confirmed object and the second preliminary detection; and
   determining that the present detections from the detectors are from a classified confirmed object in the overlapping area, and then classifying the present detections as a confirmed fused object.

9. The method according to claim 8, the method further comprises the step of controlling a safety system in dependence of the acquired detections.

10. The method according to claim 8, further comprising in that the at least two detectors are radar detectors, each radar detector having a corresponding transceiver arrangement that is used for sending and receiving radar signals.

11. The method according to claim 8, further comprising each of the two detectors uses a corresponding detector control unit, where one detector control unit is a dedicated detector master control unit that is used for communicating with the other detector control units and for communicating with at least one other control unit, where the other control unit is used for controlling a safety system.

* * * * *